(12) United States Patent
Zhu et al.

(10) Patent No.: US 6,937,483 B2
(45) Date of Patent: Aug. 30, 2005

(54) DEVICE AND METHOD OF COMMUTATION CONTROL FOR AN ISOLATED BOOST CONVERTER

(75) Inventors: Lizhi Zhu, Canton, MI (US); Xingyi Xu, Shanghai (CN)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/345,894

(22) Filed: Jan. 15, 2003

(65) Prior Publication Data

US 2003/0198064 A1 Oct. 23, 2003

Related U.S. Application Data

(60) Provisional application No. 60/319,070, filed on Jan. 16, 2002.

(51) Int. Cl.$^7$ .............................................. H02M 3/335
(52) U.S. Cl. ....................................................... 363/17
(58) Field of Search ................................. 363/17, 56.02, 363/56.05, 98, 132

(56) References Cited

U.S. PATENT DOCUMENTS

| | | | | |
|---|---|---|---|---|
| 3,582,758 | A | * 6/1971 | Gunn | 363/127 |
| 4,953,068 | A | * 8/1990 | Henze | 363/17 |
| 5,027,264 | A | 6/1991 | DeDoncker et al. | 363/16 |
| 5,157,592 | A | 10/1992 | Walters | 363/17 |
| 5,198,969 | A | 3/1993 | Redl et al. | 363/17 |
| 5,208,740 | A | 5/1993 | Ehsani | 363/124 |
| 5,329,439 | A | * 7/1994 | Borojevic et al. | 363/87 |
| 5,353,212 | A | 10/1994 | Loftus, Jr. | 363/17 |
| 5,418,704 | A | 5/1995 | Hua et al. | 363/21 |
| 5,539,630 | A | 7/1996 | Pietkiewicz et al. | 363/17 |
| 5,550,450 | A | 8/1996 | Palko et al. | 318/800 |
| 5,559,685 | A | 9/1996 | Lauw et al. | 363/37 |
| 5,574,636 | A | 11/1996 | Lee et al. | 363/132 |
| 5,590,032 | A | 12/1996 | Bowman et al. | 363/15 |
| 5,594,634 | A | 1/1997 | Rajashekara et al. | 363/98 |
| 5,684,683 | A | 11/1997 | Divan et al. | 33/65 |
| 5,742,495 | A | 4/1998 | Barone | 363/65 |
| 5,781,419 | A | 7/1998 | Kutkut et al. | 363/17 |
| 5,838,558 | A | 11/1998 | Tan et al. | 363/91 |
| 5,872,705 | A | 2/1999 | Loftus, Jr., et al. | 363/21 |
| 5,886,884 | A | 3/1999 | Baek et al. | 363/48 |
| 5,946,200 | A | 8/1999 | Kim et al. | 363/17 |
| 5,986,899 | A | 11/1999 | Xia et al. | 363/21 |
| 5,999,417 | A | 12/1999 | Schlecht | 363/16 |
| 6,016,258 | A | 1/2000 | Jain et al. | 363/17 |
| 6,038,142 | A | 3/2000 | Fraidlin et al. | 363/17 |
| 6,118,678 | A | 9/2000 | Limpaecher et al. | 363/60 |
| 6,452,815 | B1 | * 9/2002 | Zhu et al. | 363/17 |

OTHER PUBLICATIONS

Watson, R. et al., "A Soft–Switched, Full–Bridge Boost Converter Employing an Active–Clamp Circuit," *IEEE PESC Rec.*, pp. 61–68, 1996.
Wang, K. et al., "Bi–Directional Full–Bridge DC/DC Converter with Unified Soft–Switching Scheme, Part I: Principles of Operation," in *Proceedings of the VPEC Annual Seminar*, 1998, pp. 143–149.
Wang, K. et al., "Bi–Directional Full–Bridge DC/DC Converter with Unified Soft–Switching Scheme, Part II: Design, Implementation, and Experimental Results," in *Proceedings of the VPEC Annual Seminar*, 1998, pp. 151–157.

* cited by examiner

*Primary Examiner*—Gary L. Laxton
(74) *Attorney, Agent, or Firm*—Seed IP Law Group PLLC (57) ABSTRACT

A device and method of commutation control for an isolated boost converter provides a unique commutation logic to limit voltage spikes by utilizing switches on the secondary side to minimize a mismatch between current in the inductor and current in the leakage inductance of the transformer when commutation takes places. To minimize this mismatch, the current in the leakage inductance is preset at a certain level that approaches the current in the inductor prior to the commutation, thus significantly reducing the power rating for a clamp circuit and enabling use of a simple passive clamp circuit. In addition, through unique timing of the turn-on of the secondary switches, soft switching conditions are created that eliminate turn-on losses and the reverse recovery problems of free-wheeling diodes.

20 Claims, 6 Drawing Sheets

DEVICE AND METHOD OF COMMUTATION CONTROL FOR AN ISOLATED BOOST CONVERTER

CROSS REFERENCE TO RELATED APPLICATIONS

This application claims the benefit under 35 U.S.C. § 119(e) of the U.S. Provisional Patent Application No. 60/319,070 filed Jan. 16, 2002, entitled Device And Method Of Commutation Control For An Isolated Boost Converter, such application hereby incorporated by reference in its entirety.

BACKGROUND OF THE INVENTION

1. Field of the Invention

The present invention relates generally to the field of direct current-to-direct current (DC/DC) converters, and more particularly to commutation control schemes for an isolated boost converter.

2. Description of the Related Art

Figure 1:
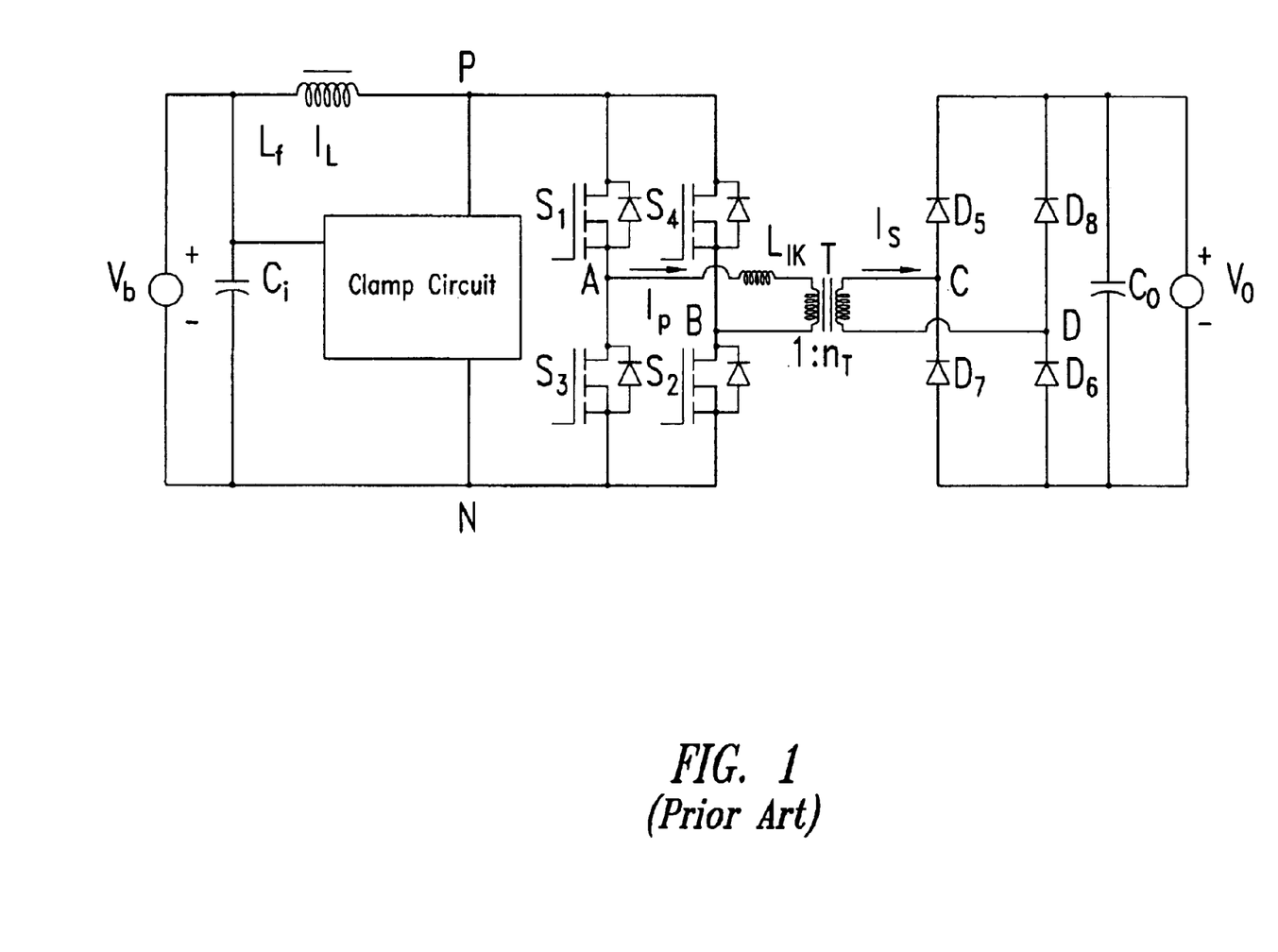
FIG. 1 is a schematic diagram that illustrates an example of a typical isolated boost DC/DC converter for converting a low voltage direct current (dc) power source to a high voltage DC power source.

Isolated DC/DC converters for converting a low voltage direct current (dc) power source, such as a 12 volt battery, to a high voltage DC power source, such as a 300V traction battery are known in the art. An example of such a converter in the form of an isolated boost DC/DC converter is illustrated in FIG. 1. In such a converter, an inductor $L_f$ is used as the current source at the low voltage side $V_b$ to reduce the RMS (root-mean-square) current rating of low voltage transistors $S_1$, $S_2$, $S_3$, and $S_4$. The low voltage transistors $S_1$, $S_2$, $S_3$, and $S_4$ operate as an inverter to convert DC current (voltage) to a high frequency alternating current (ac) (voltage). An isolation transformer T steps up the voltage to a higher level by the turns ratio, while providing galvanic isolation for safety regulations. Diodes $D_5$, $D_6$, $D_7$, and $D_8$ operate as a rectifier to convert the high frequency AC current (voltage) to the desired high DC voltage.

Referring to FIG. 1, on the input side, the function is basically to chop the low voltage from the $V_b$ energy source, such as the 12 volt battery voltage, into the AC voltage. For this particular arrangement, the inductor $L_f$ is provided to limit the inrush current. Thus, the inductor is provided to regulate the input current to limit the current from the battery. This has a number of advantages, a primary one of which is that smaller devices such as the switches, $S_1$, $S_2$, $S_3$, and $S_4$, with a lower current rating, can be used. Therefore, an advantage of adding the inductor is to limit the current, so that smaller devices can be utilized. A problem in using the inductor is that the converter also includes the transformer T, which posses non-zero leakage inductance $L_{lk}$. As more fully explained below, this non-zero leakage inductance creates a problem whenever the switch states are changed.

The way in which the primary side of the converter generates a 12 volt plus or minus square wave is that first, switches $S_1$ and $S_2$ are turned on. This connects the A terminal of the transformer to the positive or P battery terminal and the B terminal of the transformer to the negative or N battery terminal. Thus, if the voltage $V_{ab}$ across terminals A and B is plotted as a function of time, the $V_{ab}$ will be plus 12 volts. Thereafter, switches $S_1$ and $S_2$ are turned off, and switches $S_3$ and $S_4$ are turned on instead. Basically, the polarity of $V_{ab}$ is thereby reversed, and the $V_{ab}$ becomes negative 12 volts. Continuing to alternate the switches in this way produces a square waveform, and the DC voltage is changed to AC voltage. Thus, switches $S_1$, $S_2$, $S_3$, and $S_4$ invert the DC voltage to AC voltage and are referred to collectively as the inverter.

Referring once more to FIG. 1, when switches $S_1$ and $S_2$ are on, the current is drawn from the battery $V_b$ and goes through the inductance $L_f$ into the leakage inductance $L_{lk}$ of the transformer and then flows out of terminal B and is returned through switch $S_2$ to the battery $V_b$. When the polarity is changed by turning off switches $S_1$ and $S_2$ and turning on switches $S_3$ and $S_4$, the current likewise goes through the inductance $L_f$. However, the current then flows through switch $S_4$ to terminal B first and thereafter through the leakage inductance $L_{lk}$ of the transformer and out from the leakage inductance $L_{lk}$ to terminal A and is then returned through switch $S_3$ to the negative bus N. Thus, it can be seen that the current inside the leakage inductance $L_{lk}$ has a reversed polarity. This process is referred to as commutation.

Whenever there is a change of current in an inductor, there is a voltage across the inductor referred to as Ldl/dt, i.e., the inductance L times the rate of current change dI/dt. The change of the polarity of the current in the leakage inductance occurs as the switches are turned on and off at a level of micro-seconds. Therefore, if the input current is, for example, 150 amperes, it becomes negative 150 amperes in one or two micro-seconds. Thus, the dI/dt is very high, and if the inductance leakage is not at zero, the voltage can be sizeable. For example, the leakage inductance associated with the power stage of a DC/DC converter is typically in the range of ten microhenries. When the current is reversed 300 amperes from plus 150 amperes to negative 150 amperes in half a micro-second, if the leakage inductance is, for example, four or five microhenries, the voltage is in the range of about 2000 volts. The switches $S_1$, $S_2$, $S_3$, and $S_4$, which are power transistors, have a voltage limit, and it can be very difficult for these transistors to withstand such a high voltage spike.

This huge voltage spike can damage the power transistor $S_1$, $S_2$, $S_3$, and $S_4$. A typical approach to dealing with this problem is a passive clamp circuit, as shown in FIG. 1, which is basically a capacitor with a diode. When the voltage is beyond the capacitor voltage, the diode conducts and diverts the energy to the capacitor to clamp out the voltage spike. In that way, the switches $S_1$, $S_2$, $S_3$, and $S_4$ can be protected from an over-voltage situation. However, each time the voltage is clamped, energy that is transferred from the leakage inductance $L_{lk}$ is stored in the clamp capacitor. That energy will charge up the capacitor unless a way is provided to deplete the capacitor or to consume the energy each time the transistors are switched. That is usually done by a resistor in parallel with the capacitor to bleed out the capacitor voltage. Each time the polarity of the current in the leakage inductance $L_{lk}$ is switched, the energy stored in the leakage inductor is lost and therefore wasted if a passive clamp circuit is used.

BRIEF SUMMARY OF THE INVENTION

It is a feature and advantage of the present invention to provide a device and method of commutation control for an isolated boost converter that minimizes energy that is wasted in a clamp circuit by creating a momentary short circuit on the secondary winding of the transformer, thereby improving efficiency and minimizing the size of the clamp circuit.

It is a further feature and advantage of the present invention to provide a device and method of commutation control for an isolated boost converter that creates proper switching conditions to eliminate oscillation due to parasitic parameters by appropriate timing of the turn-on of secondary switches.

To achieve the stated and other features, advantages and objects, an embodiment of the present invention provides a soft switching commutation control scheme for isolated boost converters in which current in the leakage inductance of the transformer is preset to significantly reduce the mismatch current with the inductor during commutation, thereby significantly reducing the power rating for the voltage clamp circuit for the low voltage inverter. Thus, a simple passive clamp circuit becomes feasible. A unique control logic implements a partial resonant and then free-wheeling operation from the high voltage side to achieve leakage current presetting. This control scheme makes use of parasitic parameters, such as transformer leakage inductance and transistor output junction capacitors, and the operation is insensitive to these parasitic parameters. Natural soft switching is achieved for the transistors at the high voltage side, which leads to lower switching loss and lower electromagnetic interference (EMI).

An embodiment of the present invention utilizes, for example, an inductor capable of storing energy from a direct current power source, such as a DC battery, an inverter circuit coupled to the inductor capable of converting direct current to alternating current, a transformer coupled to the inverter and having a primary and a secondary and capable of stepping up voltage of the alternating current, and a rectifier circuit coupled to the transformer that is capable of converting the stepped up alternating current to direct current for delivery to a load. In addition, a programmable controller is pre-programmed with a commutation logic whereby, in a charging inductor switching mode of the inverter circuit that is timed to occur between alternating positive and negative current switching modes of the inverter circuit, energy from the direct current power source is stored in the inductor, and the leakage inductance current of the transformer is preset to a value close to the inductor current by short circuiting the transformer secondary during the charging inductor switching mode of the inverter circuit.

The inverter circuit includes, for example, first, second, third and fourth switches ($S_1$, $S_2$, $S_3$, and $S_4$), and the programmable controller is programmed with commutation logic whereby, in the charging inductor switching mode of the inverter circuit, the primary is short circuited with the first, second, third and fourth switches ($S_1$, $S_2$, $S_3$, and $S_4$) turned on. In the positive current switching mode, the first and second switches ($S_1$ and $S_2$) are turned on and the third and fourth switches ($S_3$ and $S_4$) are turned off, energy is transferred from the inductor to the secondary, arid current in the transformer is positive. In the negative current switching mode, the third and fourth switches ($S_3$ and $S_4$) are turned on and the first and second switches ($S_1$ and $S_2$) are turned off, energy is transferred from the inductor to the secondary, and current in the transformer is negative.

The rectifier circuit includes, for example, fifth, sixth, seventh, and eighth switches ($S_5$, $D_6$, $S_7$, and $D_8$), and the programmable controller is also programmed with commutation logic whereby the leakage inductance current of the transformer is preset to the value close to the input inductor current and the commutation of the leakage inductance current is accelerated. This is achieved by turning on either the fifth or seventh switches ($S_5$ and $S_7$) to short circuit the secondary during the charging inductor switching mode of the inverter circuit. The sixth and eighth switches ($D_6$ and $D_8$), for example, are diodes. $D_8$ is automatically on when $S_5$ is turned on, while $D_6$ is automatically on when $S_7$ is turned on. Either the fifth ($S_5$ with $D_8$ automatically on) or seventh switch ($S_7$ with $D_6$ automatically on) is turned on during the positive and negative current switching modes to create a momentary short circuit on the secondary of the transformer to preset the leakage inductance current in the transformer to a predetermined value that approaches a current value in the inductor.

In the soft switching aspect, the controller is programmed with commutation logic whereby the fifth ($S_5$) and seventh ($S_7$) switches are each turned on according to a predetermined time sequence to create zero voltage switching conditions. To accomplish this, the fifth ($S_5$) and seventh ($S_7$) switches are each turned on into a conducting diode. The zero voltage switching eliminates turn on loss and eliminates the reverse recovery problems for freewheeling diodes.

Additional novel features, advantages and objects of the invention will be set forth in part in the description which follows, and in part will become more apparent to those skilled in the art upon examination of the following, or may be learned by practice of the invention.

DETAILED DESCRIPTION OF THE INVENTION

In the following description, certain specific details are set forth in order to provide a through understanding of various embodiments of the invention. However, one skilled in the art will understand that the invention may be practiced without these details. In other instances, well-known structures associated with electrical circuits and circuit elements have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Figure 3:
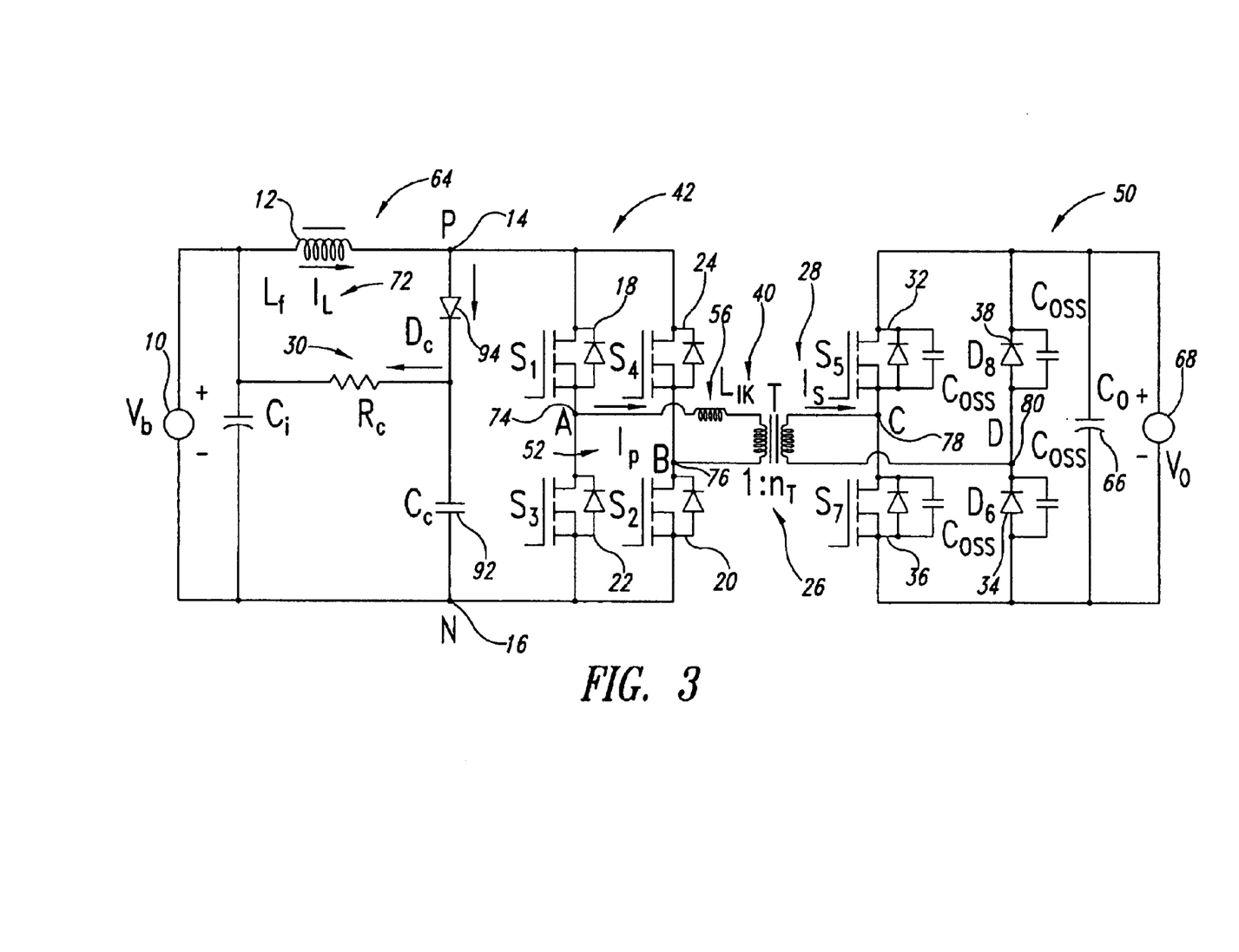
FIG. 3 is a schematic diagram that illustrates an example of the isolated boost topology for an embodiment of the present invention.

Reference is now made in detail to an embodiment of the present invention, an example of which is illustrated in the accompanying drawings, in which like numerals designate like components. The present invention makes use, for example, of isolated buck DC/DC converter topology to run a dual mode-boost mode operation with a novel soft switching commutation control scheme. FIG. 3 is a schematic diagram that illustrates an example of the isolated boost topology enabled by an embodiment of the present invention. Referring to FIG. 3, the isolated boost DC/DC converter topology of the present invention includes, for example, the input source $V_b$ 10, the input inductor $L_f$ 12, the positive and negative bus P 14 and N 16, the low voltage transistors $S_1$ 18, $S_2$ 20, $S_3$ 22, and $S_4$ 24, and the isolation transformer 26. As used herein, on the secondary side in FIGS. 1, 3, and 5, unless otherwise provided, the letter "S " indicates an active switch, the letter "D" indicates a diode, and the numerals 5 through 8 indicate a position.

An embodiment of the present invention includes, for example, two aspects. One aspect involves creating a momentary short circuit on the secondary winding 28 of the transformer 26 to minimize the energy going into the clamp circuit 30, thereby improving efficiency and minimizing the size of the clamp circuit 30. Another aspect involves properly timing the turn-on of the secondary switches $S_5$ 32 and $S_7$ 36 to create proper zero voltage switching conditions that eliminate oscillation due to parasitic parameters and turn on losses. According to an embodiment of the present invention, a unique commutation logic is utilized to limit the voltage spike by utilizing high voltage switches $S_5$ 32, $D_6$ 34, $S_7$ 36, and $D_8$ 38. This is accomplished, for example, by minimizing the mismatch between the current in the inductor $L_f$ 12 and the current in the leakage inductance $L_{lk}$ 40 when commutation takes place. In order to achieve this minimization of mismatch, the current in the leakage inductance $L_{lk}$ 40 is preset at a certain level that is close to the current in the inductor $L_f$ 12 prior to the commutation. Consequently, the power rating for the clamp circuit is significantly reduced and a simple passive clamp circuit 30, as shown in FIG. 3, can be employed.

Figure 4:
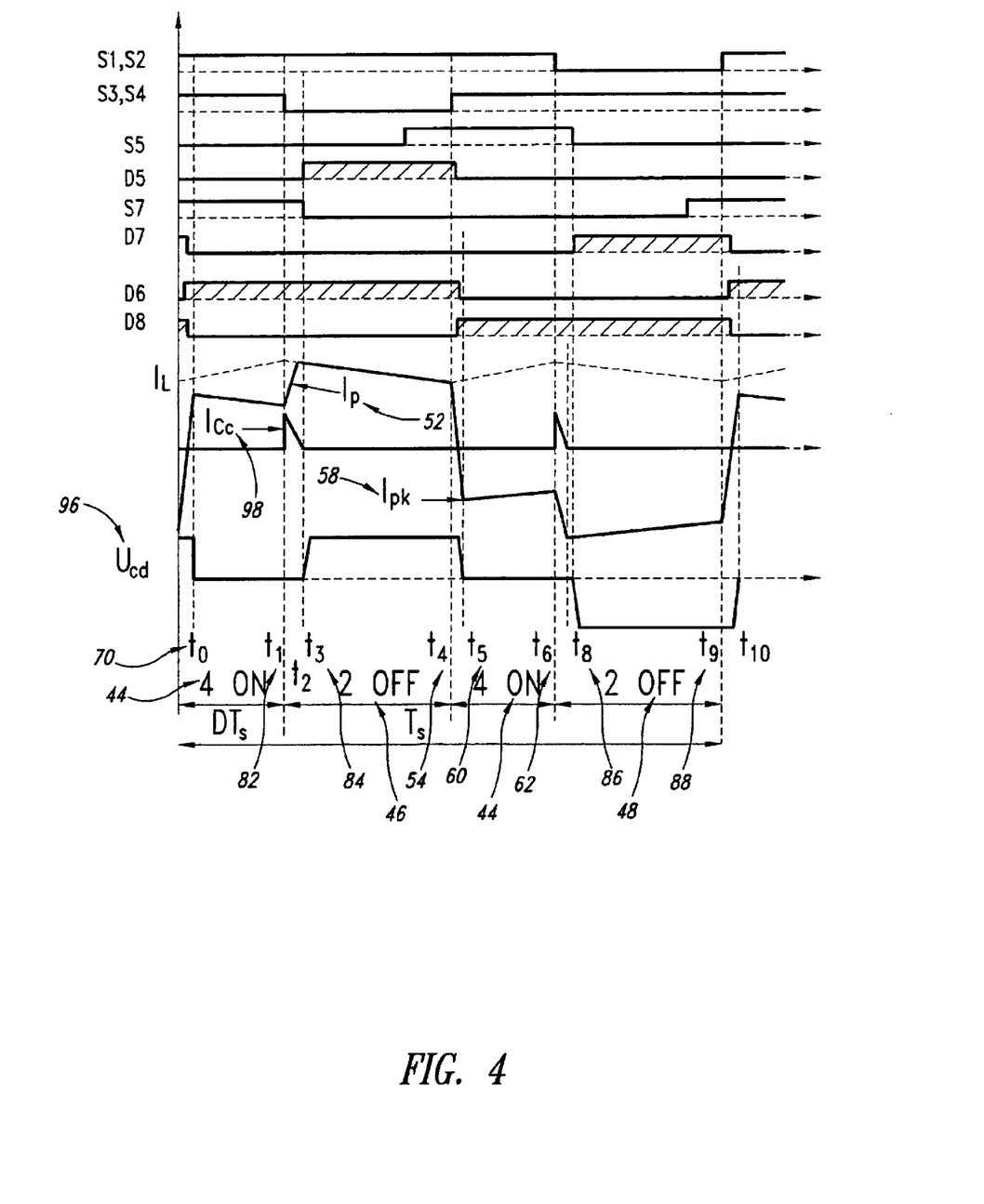
FIG. 4 is a plot which shows examples of waveforms for the operation of the DC/DC converter control scheme of FIG. 2.

FIG. 4 shows waveforms for operation of the DC/DC converter control scheme of FIG. 3. The low voltage inverter 42 consisting of switches $S_1$ 18, $S_2$ 20, $S_3$ 22, and $S_4$ 24, operates basically in three modes, including a 4ON mode 44 (also referred to as the charging mode), a $S_1$ and $S_2$ ON mode 46 (also referred to as the positive mode), and a $S_3$ and $S_4$ ON mode 48 (also referred to as the negative mode). For the 4ON mode 44, all four of the transistors $S_1$ 18, $S_2$ 20, $S_3$ 22, and $S_4$ 24, are turned on. In the 4ON mode 44, the energy is transferred from the low voltage power source $V_b$ 10, such as a battery, to the inductor $L_f$ 12 (charging the inductor). For the $S_1$ and $S_2$ ON mode 46, the energy stored in the inductor $L_f$ 12 is transferred to the high voltage side 50 via the transformer 26, and current in the transformer 26 is positive ($I_p$ 52). For the $S_3$ and $S_4$ ON mode 48, the energy stored in the inductor $L_f$ 12 is transferred to the high voltage side 50 via the transformer 26, and current in the transformer 26 is negative ($I_p$ 52). The commutation takes place when the operation changes among the three basic modes, 4ON 44, $S_1$ and $S_2$ ON 46, and $S_3$ and $S_4$ ON 48.

Figure 2:
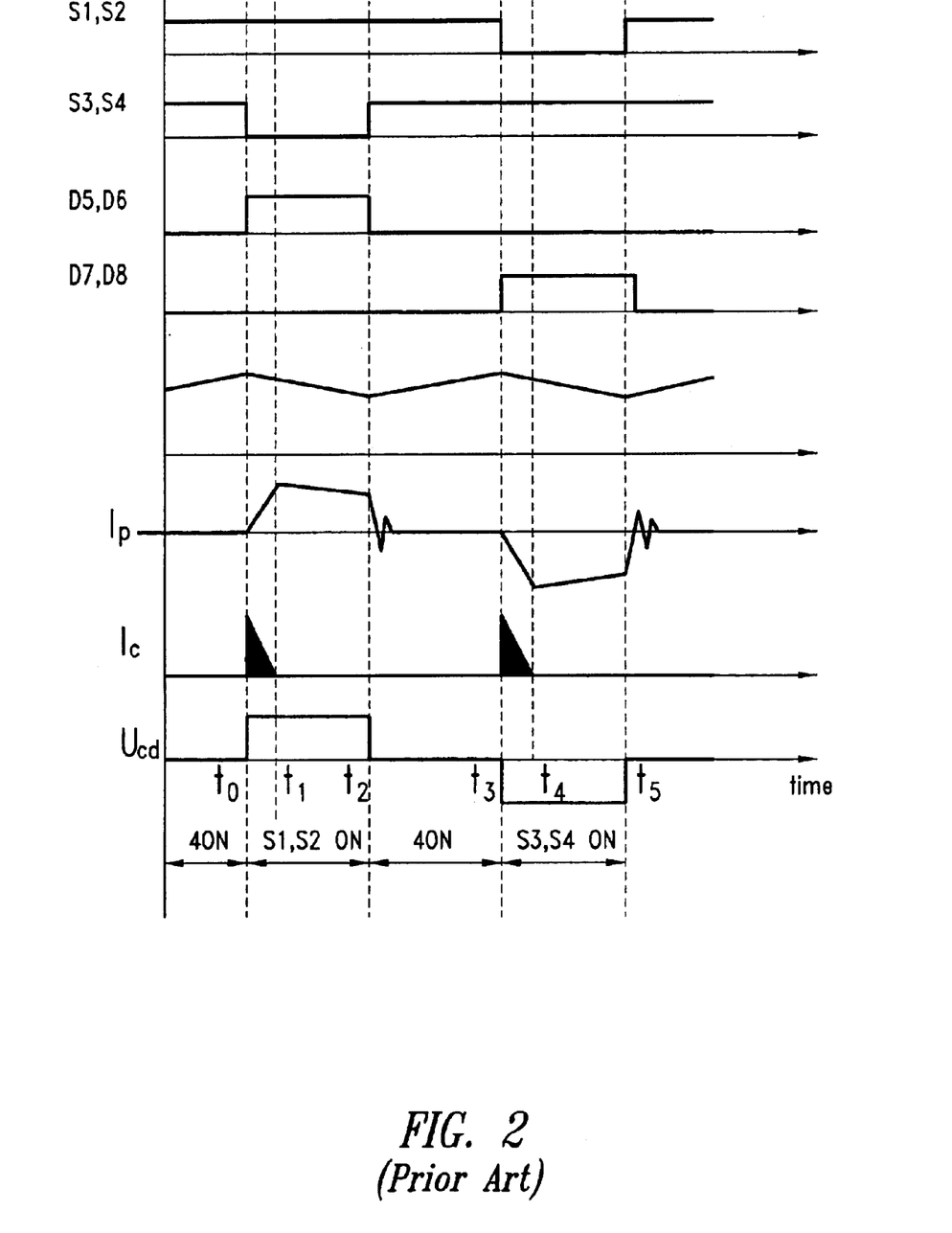
FIG. 2 is a plot which shows examples of waveforms for the operation of the DC/DC converter of FIG. 1.

In a conventional converter as shown in FIG. 1, the output rectifier bridge comprises four diodes $D_5$, $D_6$, $D_7$, and $D_8$. Referring to FIG. 2 for current waveforms of the conventional converter during commutation, during the 4ON mode (prior to $t_0$ and from $t_2$ to $t_3$) the primary of the transformer is disconnected from the input inductor $L_f$ and short circuited. As a result, the transformer leakage inductance current $I_l$ settles to zero after some initial oscillations. On the secondary side, all the diodes cease to conduct after the leakage inductance current reaches zero. When the low voltage inverter on the primary side switches from 4ON mode to $S_1$ and $S_2$ ON mode, the leakage inductance is connected to the input inductance. The leakage inductance current $I_p$ will ramp up from zero to the inductor current $I_L$ which is roughly the same as the load current. This transition is completed in the commutation period $t_0$ to $t_1$. As soon as current in the leakage inductance starts to flow, the diodes $D_5$ and $D_6$ on the secondary of the transformer start to conduct. In this case, the output voltage on the secondary of the transformer, $U_{cd}$, equals the output voltage $V_o$. Similarly, when the low voltage inverter switches from 4ON mode to $S_3$ and $S_4$ ON mode, at $t_3$, the leakage inductance current will ramp down from zero to the negative of the inductor current $I_L$. In this case, $D_7$ and $D_8$ conduct and $U_{cd}=-V_o$.

The difference between the leakage inductance current $I_p$ and the input inductor current $I_L$ during the commutation interval is the current flowing into the clamping circuit $I_C$. Referring again to FIG. 2, the shaded area beneath the clamping current $I_C$ represents the total charge transferred into the clamp capacitor $C_c$ each time commutation occurs. The total charge multiplied by the clamping capacitor voltage $V_c$ represents the energy being transferred to the clamping capacitor each time commutation occurs. As discussed previously, the energy transferred to the clamping circuit is eventually consumed by the resistor $R_c$. A feature and advantage of an embodiment of the present invention is to minimize the commutation energy transferred to the clamping circuit.

One major drawback of the conventional boost converter in FIG. 1 is that it results in excessive commutation energy loss in the clamping circuit. This is due to two reasons. First, the leakage inductance current $I_p$ is always reset to zero prior to the commutation period. As a result, the peak value of the clamping current is always $I_L$, which is roughly equal to the load current. For a 3 kW boost converter, the peak $I_C$ can be as high as 350A. This excessively high peak $I_C$ yields excessive commutation loss in the clamping circuit.

The second reason why commutation loss is high in the conventional boost converter is due to the relatively long commutation interval, i.e. $t_0$ to $t_1$ or $t_3$ to $t_4$ in FIG. 2. Referring to the conventional circuit in FIG. 1, at to, $S_1$ and $S_2$ on the primary side of the transformer is turned on. The primary side voltage $U_{ab}$ is quickly built up to the clamping voltage $V_c$. Usually, $V_c$ is selected to be close to the input voltage $V_b$ (for example, $V_c=2V_b$) so as to minimize the voltage rating of the switches $S_1$, $S_2$, $S_3$, and $S_4$. On the secondary side, $D_5$ and $D_6$ are on, imposing +$V_o$ to the secondary of the transformer. When the secondary voltage is reflected by the turns ratio, $n_T$, to the primary, the reflected voltage $V_o/n_T$ is approximately equal to $V_b$. The voltage across the leakage inductance, $L_{lk}$, is the difference between the clamp voltage and the reflected secondary voltage, i.e. $V_c-V_o/n_T$, which is a relatively small quantity. Since the voltage across the leakage inductance $L_{lk}$ is proportional to the rate of change of the current in $L_{lk}$, it follows that a small voltage across $L_{lk}$ leads to the slow change of the current in $L_{lk}$, i.e. it would take a relatively long time for the commutation to complete. The long commutation time means a large value for the shaded area in FIG. 2, which means more commutation energy loss.

A feature of the present invention involves reducing the commutation energy loss by overcoming the aforementioned difficulties in the conventional boost converter. In this aspect, two diodes on the secondary side of the transformer, for example, $D_5$ and $D_7$ shown in FIG. 1, are replaced by two active switches $S_5$ 32 and $S_7$ 36 as shown in FIG. 3. Referring to FIG. 4 for the operation of the boost converter for an embodiment of the present invention, from $t_3$ 84 to $t_4$ 54, the primary side inverter 42 is in $S_1$, $S_2$ ON mode 46. On the secondary side 50, the switch $S_5$ 32 and diode $D_6$ 34 are on, the energy is transferring from $V_b$ 10 to $V_o$ 68. $S_5$ 32 is turned on sometime between $t_3$ 84 and $t_4$ 54. However, because of the direction of the secondary current, $S_5$ 32 is not carrying the current. At $t_4$ 54, $S_3$ 22 and $S_4$ 24 are turned on. The primary side inverter 42 enters 4ON mode 44. During this mode, the primary of the transformer 26 is shorted and disconnected from the input inductance 56. Consequently, the current $I_p$ 52 in the leakage inductance decays rapidly from $I_L$ 72 towards zero. A resonant circuit exists between the leakage inductance $L_{lk}$ 40 and the parasitic capacitance associated with the semiconductor switches $S_5$ 32, $S_7$ 36, $D_6$ 34, and $D_8$ 38, which push the leakage inductance current $I_p$ 52 to negative value. Once the current $I_p$ 52 becomes negative, it flows through $D_8$ 38 and $S_5$ 32 which has already been turned on. $S_5$ 32 and $D_8$ 38 effectively short circuit the secondary of the transformer 26, providing zero voltage across the leakage inductance $L_{lk}$ 40. As a result, the leakage inductance current 52 is "held" at —$I_{pk}$ 58, which is determined by the output voltage $V_o$ 68, the leakage inductance $L_{lk}$ 40 of the transformer 26, and the parasitic capacitors of the switches, during the entire 4ON mode 44.

Referring further to FIG. 4, at $t_6$ 62, $S_1$ 18 and $S_2$ 20 are turned off, the primary side inverter 42 enters the $S_3$, $S_4$ ON mode 48. The leakage inductance current $I_p$ 52 is expected to build up to $I_L$ 72. Since the leakage inductance current $I_p$ 52 has been held at $I_{pk}$ 58 in the 4ON mode 44 prior to the commutation, the mismatch between the current in the input inductor 56 and the current $I_p$ 52 in the leakage inductance is minimized. Therefore, the peak value of the current flowing into the clamping circuit, $I_{Cc}$ 98, is minimized.

Moreover, in an aspect of the present invention, the commutation interval is shortened. Referring again to FIG. 4, $S_5$ 32 remains on until $t_8$ 86. This means that the transformer secondary remains shorted during the entire commutation interval from $t_6$ 62 to $t_8$ 86. As a result, the reflected voltage to the primary is zero. The voltage across the leakage inductance $L_{lk}$ 40 during the commutation interval is the clamping voltage $V_c$. In comparison to the conventional DC/DC case, where the voltage across the leakage inductance $L_{lk}$ 40 during the commutation interval is $V_c$-$V_o/n_T$, the present invention provides higher voltage across the leakage inductance $L_{lk}$ 40, thereby accelerating the commutation process. This shortened commutation interval, combined with lower peak value of $I_{Cc}$ 98, results in significant reduction in the commutation energy loss.

In a symmetrical manner, one can analyze the operation of the circuit during the time intervals of $t_g$ 88 to $t_{10}$ and $t_1$ 82 to $t_3$ 84 with proper switching pattern for $S_7$ 36.

In addition to the advantage of reduced commutation loss, an embodiment of the present invention provides an additional feature of soft switching. Referring once more to FIG. 4, $S_5$ 32 is turned on at or before $t_4$ 54 when its anti-parallel diode is actually conducting the current. A zero voltage turn-on condition is created for $S_5$ 32. Consequently, there is essentially no turn-on loss for $S_5$ 32. Also, when $S_5$ 32 is turned on, its complementary diode, the anti-parallel diode for $S_7$ 36, is not conducting current. Therefore, reverse recovery of the diode in $S_7$ is not an issue here. Hence, a slow diode such as the body diode of a MOSFET can be used instead of expensive power diodes with fast recovery characteristics.

An embodiment of the present invention includes, for example, at least two important aspects. One such aspect is to create a momentary short circuit on the secondary winding 28 to minimize the energy going into the clamp circuit 30, thereby improving efficiency and minimizing the size of the clamp circuit 30. Another aspect is properly timing the turn-on of the secondary switches $S_5$ 32 and $S_7$ 36 to create proper switching conditions that eliminate turn on losses in $S_5$ 32 and $S_7$ 36, and eliminate the need for special fast recovery diodes.

In an embodiment of the present invention, active switches $S_5$ 32 and $S_7$ 36, as shown in FIG. 2, are used to replace diodes $D_5$ and $D_7$ of the conventional rectifier as shown in FIG. 1. Further, four different arrangements of the power switching devices on the secondary of the transformer can produce identical results, namely, active switches $S_5$ and $S_7$ and diodes $D_6$ and $D_8$; active switches $S_5$ and $S_8$ and diodes $D_6$ and $D_7$; active switches $S_6$ and $S_7$ and diodes $D_5$ and $D_8$; and active switches $S_6$ and $S_8$ with diodes $D_5$ and $D_7$, according to an embodiment of the present invention.

Figure 6:
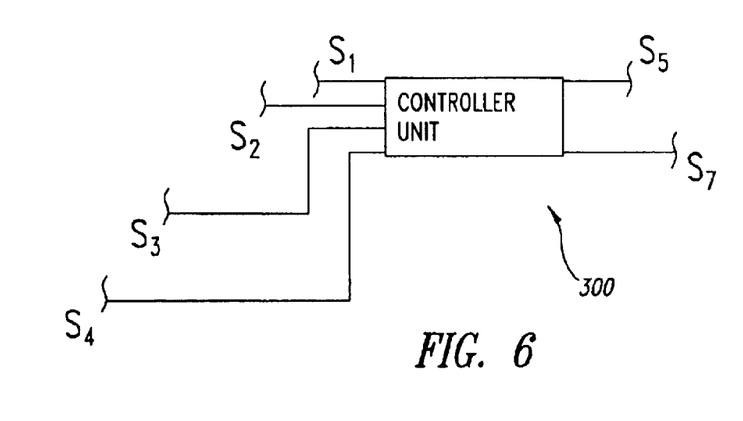
FIG. 6 is a schematic diagram of a controller suitable for use with the embodiment of FIG. 3.

Referring FIG. 6, controller unit 300 controls switches $S_1$–$S_5$ and $S_7$ of FIG. 3 in the manner described herein (e.g., as described in relation to FIG. 4), according to an embodiment of the present invention. As explained below, controller 300 can be implemented in hardware, software, and/or firmware, depending upon the design choices of the system designer.

Figure 5:
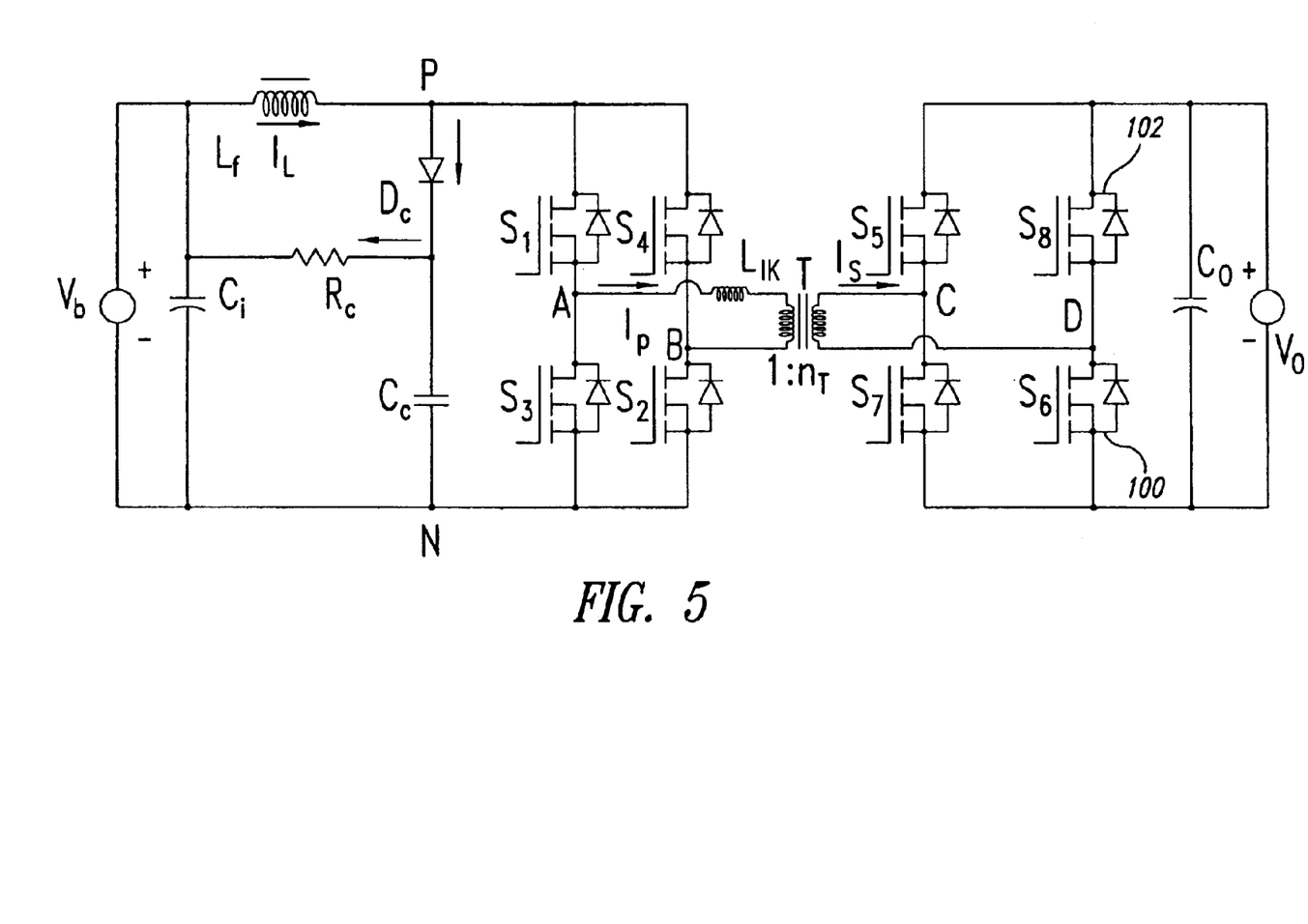
FIG. 5 is schematic diagram that illustrates an example of the DC/DC converter control scheme of FIG. 2 in which diodes $D_6$ and $D_8$ are replaced with transistors to achieve bi-directional operation.
Figure 7:
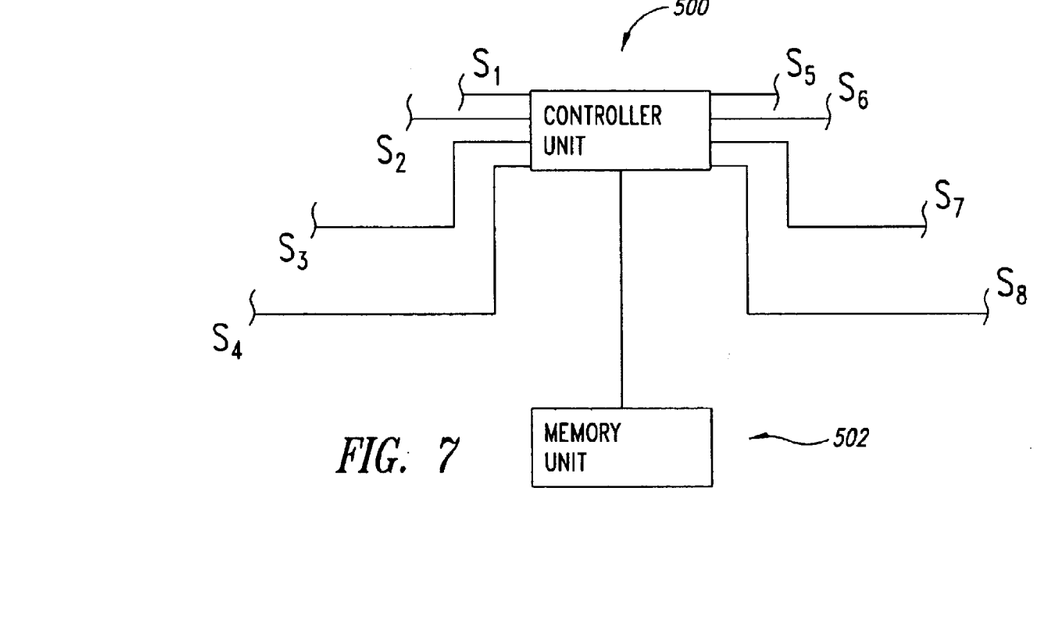
FIG. 7 is a schematic diagram of a controller suitable for use with the embodiment of FIG. 5.

Potential applications for an embodiment of the present invention include, for example, employment in a boost starter converter for a fuel cell system and potential use in HEVs. Another potential application for an embodiment of the present invention is employment for a bi-directional converter for similar applications. Simply replacing diodes $D_6$ 34 and $D_8$ 38 as shown in FIG. 3 with transistors $S_6$ 100 and $S_8$ 102 achieves bi-directional operation, as illustrated in FIG. 5, according to an embodiment of the present invention. Controller unit 500, illustrated in FIG. 7, controls switches $S_1$–$S_8$ in the manner described herein, according to an embodiment of the present invention. Controller unit 500 interacts with memory unit 502, in one embodiment, to retrieve instruction code which effects part or all of the control processes described herein.

Those having ordinary skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having ordinary skill in the art will appreciate that there are various vehicles by which aspects of processes and/or systems described herein can be effected (e.g., hardware, software, and/or firmware), and that the preferred vehicle will vary with the context in which the processes and/or systems are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which aspects of the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, schematics, and examples. Insofar as such block diagrams, schematics and examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analogue communication links using TDM or IP based communication links (e.g., packet links).

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. An isolated boost DC/DC converter, comprising:
   an inductor capable of storing energy from a direct current power source;
   an inverter circuit coupled to the inductor and capable of converting direct current to alternating current;
   a transformer coupled to the inverter circuit, the transformer comprising a primary winding and a secondary winding and capable of stepping up voltage of the alternating current;
   a rectifier circuit coupled to the transformer and comprising first and second switches coupled to a first end of the secondary winding, the rectifier circuit capable of converting the stepped up alternating current to direct current for delivery to a load; and
   a programmable controller coupled to the inverter circuit and to the rectifier circuit and configured to generate control signals to: operate the inverter circuit at a first voltage level during a first time interval; operate the inverter circuit at a second voltage level during a second time interval; and turn on the first switch during the first time interval, wherein the rectifier circuit is configured to short circuit the secondary winding through a current path including the first switch during the second time interval.

2. The isolated boost DC/DC converter according to claim 1 wherein the inverter circuit further comprises third, fourth, fifth and sixth switches, and the programmable controller is configured to operate the inverter circuit at the second voltage level by conducting current through the third, fourth, fifth and sixth switches, thereby short-circuiting the primary winding.

3. The isolated boost DC/DC converter according to claim 2 wherein the programmable controller is configured to operate the inverter circuit at the first voltage level during the first time interval by conducting current through the third and fourth switches and not conducting current through the fifth and sixth switches, such that energy is transferred from the inductor to the secondary winding, and current in the transformer is positive.

4. The isolated boost DC/DC converter according to claim 3 wherein the programmable controller is further configured to operate the inverter circuit at a third voltage level during a third time interval by conducting current through the fifth and sixth switches and not conducting current through the third and fourth switches, such that energy is transferred from the inductor to the secondary winding, and current in the transformer is negative.

5. The isolated boost DC/DC converter according to claim 1 wherein the rectifier circuit further comprises third and fourth switches, and wherein the programmable controller is configured to turn on the third switch to achieve synchronized rectification to reduce conduction loss during the second time interval.

6. The isolated boost DC/DC converter according to claim 1 wherein the rectifier circuit further comprises third and fourth switches and the first, second, third and fourth switches compromise transistors capable of bi-directional operation.

7. A device for use with a DC/DC converter, the device comprising:
   a transformer comprising a primary winding and a secondary winding; and
   a circuit configured to short circuit the secondary winding in response to a reversal of current direction through the primary winding, the circuit comprising:
      a first switch controlled to couple a first end of the secondary winding to a first node substantially subsequent to a first time when a positive polarity voltage is applied between a first end of the primary winding and a second end of the primary winding;
      a first diode comprising a first-diode anode (+) coupled to a second end of the secondary winding and a first-diode cathode (−) coupled to the first node; and
      a second diode comprising a second-diode cathode (−) coupled to the second end of the secondary winding and a second-diode anode (+) coupled to a second node.

8. The device of claim 7 wherein the circuit further comprises a transistor comprising an associated capacitance.

9. The device of claim 7, further comprising:
   at least one of the first diode and the second diode comprising an associated capacitance.

10. The device of claim 7, further comprising:
    a second switch controlled to couple a terminal of an inductor to the first end of the primary winding during the first time; and
    a third switch controlled to couple the second end of the primary winding to a third node during the first time.

11. The device of claim 10, further comprising:
    a fourth switch controlled to couple the first end of the secondary winding to the second node substantially subsequent to a second time when a negative polarity voltage is applied between the first end of the primary winding and the second end of the primary winding;

a fifth switch controlled to couple the terminal of the inductor to the second end of the primary winding during the second time; and a sixth switch controlled to couple the first end of the primary winding to the third node during the second time.

12. A method for use with a DC/DC converter, the method comprising:

coupling a rectifier circuit to a secondary winding of a transformer; and configuring the rectifier circuit to short circuit the secondary winding of the transformer in response to a first change in a direction of a current through the secondary winding of the transformer, wherein the rectifier circuit comprises a first transistor coupled between a first terminal of the secondary winding of the transformer and a first node and a first diode coupled between a second terminal of the secondary winding of the transformer and the first node and wherein configuring the rectifier circuit to short circuit the secondary winding in response to a first change in a direction of a current through the secondary winding of the transformer comprises turning on the first transistor when the current through the secondary winding is flowing in a first direction and the first diode is not conducting any current and configuring the first diode to conduct current in response to a change in the direction of the current through the secondary winding.

13. The method of claim 12 wherein the rectifier circuit further comprises a second transistor coupled between the first terminal of the secondary winding of the transformer and a second node and a second diode coupled between the second terminal of the secondary winding of the transformer and the second node, the method further comprising turning on the second transistor when the current through the secondary winding is flowing in a second direction and the second diode is not conducting any current and configuring the second diode to conduct current in response to a change in the direction of the current through the secondary winding.

14. A DC/DC power converter, comprising:

an inductor;

an inverter circuit comprising first, second, third and fourth transistors and coupled to the inductor;

a rectifier circuit comprising fifth and sixth transistors and first and second diodes;

a transformer comprising a primary winding and a secondary winding wherein the primary winding is coupled to the inverter circuit and the secondary winding is coupled to the rectifier circuit; and a controller coupled to the first, second, third, fourth, fifth and sixth transistors, wherein the controller is configured to operate the power converter in a first mode for a first time interval during which the first, second, third, fourth and sixth transistors are on and the fifth transistor is off, in a second mode for a second time interval by switching off the third and fourth transistors, in a third mode for a third time interval by switching off the sixth transistor, in a fourth mode for a fourth time interval by switching on the fifth transistor and in a fifth mode for a fifth time interval by turning on the third and fourth transistors.

15. The converter of claim 14 wherein the controller is further configured to operate the converter in a sixth mode for a sixth time interval by turning off the first and second transistors, in a seventh mode for a seventh time interval by turning off the fifth transistor, and in an eighth mode for an eighth time interval by turning on the sixth transistor.

16. The converter of claim 14 wherein the first diode is non-conducting during the fourth time interval and becomes conductive during the fifth time interval.

17. The converter of claim 16 wherein the controller is further configured to operate the converter in a ninth mode for a ninth time interval by turning on the first and second transistors and the second diode is non-conductive during the eighth time interval and becomes conductive during the ninth time interval.

18. A DC/DC power converter, comprising:

an inductor;

an inverter circuit comprising first, second, third and fourth transistors and coupled to the inductor;

a rectifier circuit comprising fifth, sixth, seventh and eighth transistors;

a transformer comprising a primary winding and a secondary winding wherein the primary winding is coupled to the inverter circuit and the secondary winding is coupled to the rectifier circuit; and a controller coupled to the first, second, third, fourth, fifth, sixth, seventh and eighth transistors, wherein the controller is configured to operate the power converter in a first mode for a first time interval during which the first, second, third, fourth, sixth and seventh transistors are on and the fifth and eighth transistors are off, in a second mode for a second time interval by switching off the third and fourth transistors, in a third mode for a third time interval by switching off the seventh transistor, in a fourth mode for a fourth time interval by switching on the fifth transistor, in a fifth mode for a fifth time interval by turning on the third and fourth transistors and in a sixth mode for a sixth time interval by turning off the sixth transistor and turning on the eighth transistor.

19. A method of operating a DC/DC converter, comprising:

coupling an inverter circuit to a primary winding of a transformer;

coupling a secondary winding of the transformer to a rectifier circuit;

configuring the inverter circuit to cycle between four modes of operation, namely a positive alternating current mode, a first charging mode, a negative alternating current mode and a second charging mode; and configuring the rectifier circuit during the positive alternating current mode to hold a leakage inductance current of the primary winding of the transformer at a substantially constant level during a significant portion of the first charging mode.

20. The method of claim 19, further comprising configuring the rectifier circuit to maintain a positive output current when the inverter circuit cycles between the four modes of operation.

* * * * *